Nov. 18, 1969   R. M. GWYNN ET AL   3,479,275
ELECTROLYTIC CELL
Filed June 1, 1967

INVENTORS
ROSS M. GWYNN
TIM THEMY
BY
Howard E. Thompson Jr
ATTORNEY

United States Patent Office 3,479,275
Patented Nov. 18, 1969

3,479,275
ELECTROLYTIC CELL
Ross M. Gwynn, 4724 Donnie Lyn Way, and Tim Themy, 5735 Hesper Way, both of Carmichael, Calif. 95608
Filed June 1, 1967, Ser. No. 642,951
Int. Cl. C23b 5/68
U.S. Cl. 204—275                                14 Claims

ABSTRACT OF THE DISCLOSURE

An electrolytic cell for flow-through type operation having general applicability to semi-continuous electrolytic processes including in particular corrosive chlorinating, hypochlorinating and similar treatments of water for sterilization purposes. An electrode assemblage is detachably supported within an elongated transparent pressure resistant casing by means of an end closure having an enlarged manifold for collecting and discharging electrolyte and products of electrolysis. The electrode assemblage supports closely spaced electrodes with all electrode surfaces except the juxtaposed surfaces enveloped in insulating plastic material, and providing a fluid passage and electrolysis chamber through the assemblage having a cross section at least as great as the cross section of fluid inlet and outlet means of the cell.

The cell is intended for direct current operation with pjolarity being reversed at frequent intervals, and buildup of solid products of electrolysis is further minimized by providing in the collecting manifold a cross section substantially greater than, and oriented angularly to, that of the electrolysis chamber and unobstructed communication between said manifold and the fluid outlet. Detection of dangerous solids accumulation in the cell is facilitated by employing transparent plastic material in the end closures and electrode supports; and the parts of the cell are readily disassembled for cleaning and servicing.

BACKGROUND OF THE INVENTION

Electrolytic cells of various types which have long been known in the art fall into two general categories. In one type a body of electrolyte, with possible intermittent or gradual continuous replenishment, is subjected to electrolysis for extended periods for the purpose of collecting gaseous or other products of the electrolysis. In another basic type of cell electrolyte is contacted with the electrodes in a continuous stream with any increment of the electrolyte being subjected to electrolysis for only a very brief time interval. The latter type of cell as used in various chemical processes and particularly in the chlorinating and hypochlorinating of water for purification purposes generally involves operation under pressure of the order of 20 to 60 pounds per square inch and higher. This pressure coupled with the corrosiveness frequently encountered in electrolytes and in the products of electrolysis presents distinct problems in providing a cell which is both economical and durable.

One approach in the past has been to provide electrode surfaces on part of a massive cell structure which can withstand the internal pressure above mentioned. This, however, has obvious economical disadvantages since even with platinum coating, electrode surfaces may become damaged or inactivated in use, and with this type of construction the entire cell must be replaced. Another approach in the past has been to merely suspend electrodes in a suitable pressurized chamber through which the electrolyte is passed. While this type of arrangement can work reasonably well with electrodes that are completely coated with platinum or other resistant metal, the primary electrolysis will take place between the juxtaposed surfaces of the electrodes, and the special coating on remote electrode surfaces contributes little to the generation of electrolysis products. On the other hand the use of electrodes coated on only the more active surface in such a setup is unsatisfactory because corrosive products of the electrolysis coming in contact with unprotected electrode surfaces can lead to corrosion which will shorten electrode life. Calcium deposits, which readily form when even moderately hard waters are being treated, are a particular problem since they can rapidly damage platinum metal electrode surfaces.

There is a distinct need, therefore, for an improved type of electrolytic cell for handling pressurized flow-through electrolytic processes. Furthermore, with the ever-increasing use of electrolytic chlorination in the purification of water for private swimming pools, there is special need for an improved cell construction which is simple enough and sturdy enough to be operated and serviced by relatively unskilled personnel.

THE INVENTION

The new cell construction in accordance with the present invention satisfies this need, while at the same time providing a superior cell for professional or commercial use in various flow-through electrolytic processes. Regarded in certain of its broader aspects the new cell in accordance with the present invention comprises a pressure chamber made up of an elongated tubular body, suitably fashioned from transparent plastic material, end closures for said tubular body carrying fluid inlet and outlet means and also preferably fashioned from transparent plastic material, at least one end closure being detachable with respect to said tubular body, and having in addition to fluid outlet means other apertures for sealably engaging protruding terminal studs of an electrode assemblage arranged within said chamber, said electrode assemblage comprising closely spaced planar electrodes supported and aligned in a plastic frame closely fitting within said tubular body and defining therebetween an electrolysis chamber, said electrolysis chamber communicating with an enlarged manifold in said outlet end closure registering with the outlet aperture therein, the cross-sectional area of the electrolysis chamber being not less than the cross-sectional area of the fluid inlet and outlet means, and the length of said electrodes being proportioned to the width and spacing thereof and intended fluid flow so that fluid passing therebetween has a flow rate of at least 3 to 4 inches per second, and a residence time of about 3 seconds.

The tubular body and end closures are suitably fashioned from clear methylmethacrylate resin to provide the desired strength, transparency, chemical resistance, and dielectric properties, and the detachable end closure may have threaded engagement with the tubular body portion, thereby providing very easy assembly and dis-assembly of the parts. Furthermore, by providing electrode studs spaced to engage apertures in the discharge end closure which are equally spaced from and diametrically opposed with respect to the discharge aperture, the electrode assembly can easily be removed and replaced by another standard assembly in the event of deterioration of the electrode surfaces.

The electrode assembly consists of relatively thin metal plates supported in closely spaced parallel relationship by means of grooved side rails preferably fashioned from transparent methyl methacrylate plastic to permit visual examination of the space between the electrodes, said rails being joined together by plastic panels which closely overlie and insulate the outer electrode surfaces.

With this cell construction the electrodes need be surfaced with platinum or other chemically resistant material only on the inner opposed surfaces thereof. This is due to the fact that products of the electrolysis are effectively prevented by the electrode mounting arrangement from entering the peripheral space outside the electrode assemblage, and that the insulation of the outer electrode surfaces prevents any electrolytic action on the fluid outside the electrode assemblage. This peripheral space contains a reltaively static body of the intake fluid which acts as coolant, and there is a gradual change in this body of fluid, due to gradual seepage to the manifold at the mounting end portion of the electrode assemblage.

In addition to thus permitting reliable operation with relatively less expensive single faced electrodes, the new cell appears to provide enhanced current efficiency. This may be due in part to the uniform spacing of the electrodes and the effective confinement of electrolytic action to the juxtaposed electrode surfaces.

There are three important variables in determining the size and mounting of the electrodes, namely, the spacing, width and length of the electrodes. Spacing of the electrodes will depend largely on the power source and the salinity or other ionic nature of the electrolyte. Having determined the desired spacing, the width of the electrodes should be such as to provide a cross-sectional area for the electrode chamber at least equal to the cross-sectional area of the fluid inlet and outlet of the cell. The length will then be selected to provide the desired residence time at the intended fluid flow rate. Thus it will be apparent that cells embodying the new construction can be made in a variety of sizes to meet different needs. As an alternative to increasing the size of the electrode assemblage, it may be more economical in some instances to treat larger volumes of fluid by dividing a feed stream into two or more smaller streams passing through two or more identical cells. An advantage of the use of such multiple cells would be that the feed and discharge lines to an individual cell could be closed off if repair or electrode replacement were necessary, without interfering with performance of the remaining cells.

The new electrolytic cells in accordance with the present invention will be more readily understood from a consideration of the following description taken together with the accompanying drawing in which a preferred adaptation of the invention has been illustrated with the vraious parts thereof identified by suitable reference characters in each of the views, and in which.

Figure 1:
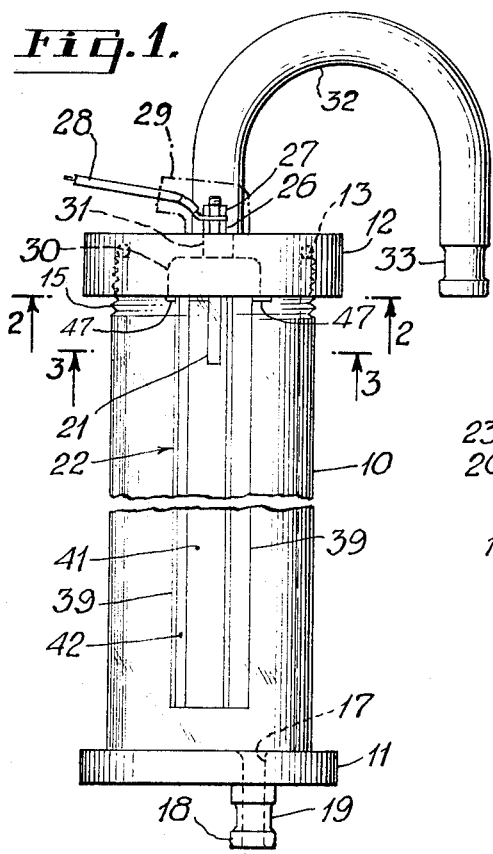
FIGURE 1 is a side elevation view of a cell illustrating the cell structure and mounting of electrodes therein.

The cell as shown in the drawing comprises a tubular body part 10 having an inlet end closure 11 and an outlet end closure 12 all formed from tough, clear, transparent plastic material, such as methyl methacrylate polymer (Plexiglas), which has a good electrical insulating properties and is resistant to chemical action by electrolytes and electrolysis products. The outlet end closure 12 is provided with a deep annular groove 13 which is threaded as seen at 14 to secure a threaded end 15 of the body 10. The fit of the threaded end 15 and groove 13 is sufficiently free to permit easy attachment and detachment of the end closure 12, and a pressure seal is provided by a gasket or O-ring 16 at the base of the groove 13.

The inlet end closure 11 can be similarly secured detachably to the body 10, or alternatively can be fixedly attached as shown in the drawing (permitting a substantially thinner wall in the end closure 11). The fixed end closure 11 can be a separate part cemented to the tubular body 10 by a suitable bonding agent, such as ethylene dichloride when bonding Plexiglas. The end closure 11 is provided with an offset aperture 17 and an aligned tubular extension 18 suitably with a zone 19 of slightly reduced diameter to facilitate firm clamping of a flexible fluid feed line. In quantity production the tubular body 10, end closure 11 and tubular extension 18 can be fashioned as a unitary body of cast or molded plastic.

The outlet end closure 12 has a pair of diametrically opposed aperture 20 for securing symmetrically disposed terminal studs 21 of an electrode assemblage 22. Inner portions of the aperture 20 are of slightly larger diameter as seen at 23 to form a shoulder 24 (note FIG. 5) for seating of an O-ring gasket 25 mounted in a circumferential groove of each stud 21. Outer ends of the studs 21 are threaded to secure clamp nuts 26 and supplemental nuts 27 for attaching electrical leads 28 as seen in FIG. 1. After attachment of leads 28 the juncture is preferably covered with a conventional insulating boot 29.

Figure 2:
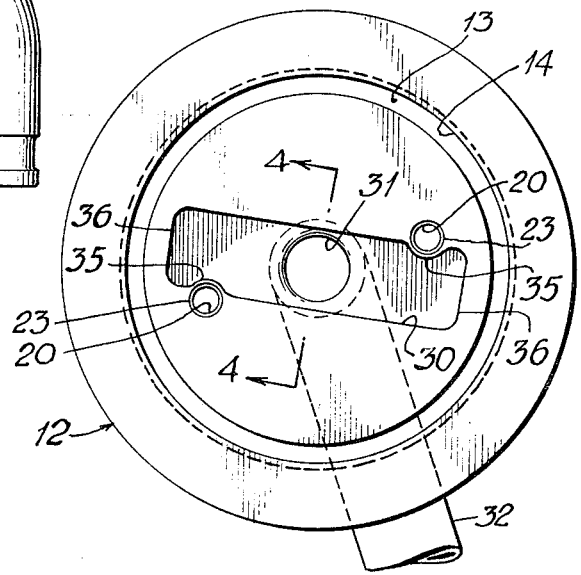
FIGURE 2 is a plan view taken in the direction of the arrows 2, 2 of the end closure at the outlet end of the device.
Figure 4:
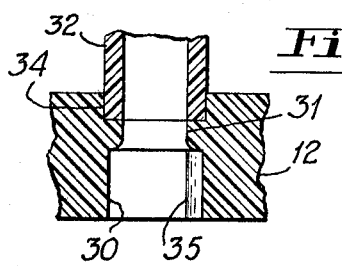
FIGURE 4 is a fragmentary sectional view substantially on the line 4—4 of FIG. 2.
Figure 5:
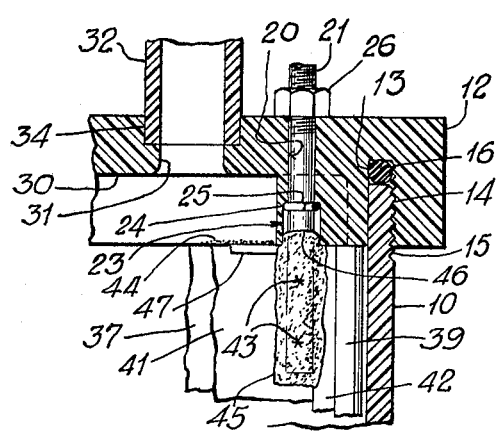
FIGURE 5 is, a fragmentary view partially in section substantially on the broken line 5, 5 in FIG. 3.

As clearly shown in FIGS. 2, 4 and 5 the inner face of the end closure 12 is provided with an enlarged recess 30 of generally rectangular contour with rounded corners disposed substantially tangentially between the aperture 20 and diametrically of the end closure 12. This recess 30 registers with a central discharge aperture 31 and aligned tubular extension 32 forming the fluid discharge for the cell. The tubular extension 32 is preferably curved to a U-shaped contour to dispose its free end 33 in substantial alignment with the lower edge of the end closure 12 and radially offset in a direction perpendicular to the plane of the aperture 20 and studs 21 as seen in FIGS. 1 and 2. This arrangement provides maximum separation of electrical leads from the connection of a flexible fluid line with the free end 33 of the discharge tube, and minimizes the possibility of electrolyte reaching the upper surface of the end closure 12 when making adjustments and repairs. In order to better support the U-shaped tube 32, 33 it is preferably cemented in a recess 34, circumferentially of the aperture 31 in the end closure 12.

As seen in FIGS. 2 and 4 the recess 30 has a width and depth slightly greater than the diameter of the discharge passage 31 and a length which disposes the ends 36 slightly beyond the apertures 20. The long sides of the recess 30 are inwardly offset as seen at 35 to provide partitions between the recess 30 and the enlargements 23 of the apertures 20. The size and arrangement of the recess 30 and its cooperation with the electrode unit 22 as hereinafter described is an important factor in making possible extended trouble free operation of the cell.

The electrode unit comprises a pair of closely spaced, parallel plate, electrodes 37 positioned and supported in grooves 38 in plastic side rails 39, and defining with the side rails 39 an elongated chamber 40, through which fluid undergoing electrolysis must pass. The electrodes, which are suitably tantalum, titanium, or alloys thereof, are faced with platinum or other metal of the platinum group on the surfaces bounding the chamber 40.

Figure 3:
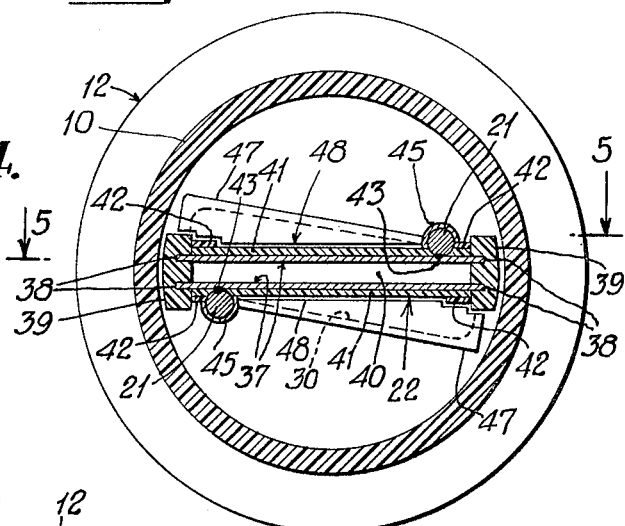
FIGURE 3 is a sectional view on the line 3, 3 in FIG. 1.

The rails 39 are joined by plastic sheets 41 which closely overlie the outer surfaces of the electrodes 37 and are cemented to the rails 39, the junctures being reinforced by cemented-in-place plastic strips 42. The rails 39, sheets 41 and strips 42 are preferably fashioned from Plexiglas and cemented together by means of ethylene dichloride. The sheets 41 are cut out to fit around the terminal studs 21 which are spot welded or otherwise bonded to the electrodes 37 as indicated at 43 (note FIG. 5); and the symmetrical arrangement of the studs as shown in FIG. 3 permits interchangeable orientation of the electrode assemblage with respect to the end closure 12.

In order to prevent seepage of electrolyte between the electrodes 37 and plastic backing sheets 41 at upper and lower ends of the electrode assemblage a thin layer of flexible sealant such as air-cured silicone latex is applied to the juxtaposed ends of the electrodes and backing sheets as indicated at 44 in FIG. 5 of the drawing. A suitable sealant is Marine Seal Silicone Rubber (a product of General Electric Company), but other air cured rubbery sealants can be employed. The sealant is also applied to all exposed portions of the studs 21 as indicated at 45, the sealant preferably extending slightly beyond the electrodes along the studs 21 to enter, and seal from electrolyte, the enlarged stud bore 23 as indicated at 46. In the resulting electrode assemblage electrolytic action is confined to the chamber 40 and the electrode surfaces bounding the chamber, a factor which is of major importance in preventing harmful buildup of solid products of electrolysis.

Another factor which is important in preventing buildup of solid products of electrolysis, such as calcium from hard waters, is the unobstructed fluid flow passage provided by the orientation of the electrolysis chamber 40 of the electrode assemblage with the enlarged recess 30 and discharge aperture 31 of the end closure 12. As seen in FIG. 3 the electrolysis chamber 40 is disposed diagonally of the recess 30, and portions of the recess 30 which protrude beyond the electrode assemblage are substantially closed by plastic (Plexiglas) plates 47 of generally triangular and slightly larger contour, which are cemented to the end closure 12 in a manner to provide slight clearance, as indicated at 48, from the electrode assemblage. This clearance permits free attachment and detachment of the electrode assemblage, as well as permitting limited seepage of electrolyte which surrounds the electrode assemblage into the discharge chamber 30.

The seepage of electrolyte through the clearance 48, together with the swirling action of fluid within the chamber 30 induced by the diagonal orientation of the electrolysis chamber 40, has been found highly effective in preventing deposits of calcium or other solid electrolysis products. Gaseous products of electrolysis are of course carried with the liquid through the discharge 31, 32.

It will be noted that the side rails 39 of the electrode assemblage are slightly spaced from the inner wall of the body 10 so that there is free rotary and axial movement of the electrode assemblage within the body 10 as the end closure 12 is being removed from or attached to the body 10. Thus it will be apparent that by merely disconnecting electrical connections from the protruding studs 21, and breaking the fluid coupling at the discharge end 33 of the outlet tube, the electrode assemblage becomes readily accessible for cleaning, replacement or repair.

For a better understanding of the device as shown in the drawing it should be pointed out that the device as illustrated is intended to handle a fluid flow of about 2 to 9 gallons per minute, and operate at a current density of about 1.5 to 2.0 amps per square inch of electrode surface. The electrodes are approximately 6 inches long, are spaced apart approximately 5/32 of an inch and have a width of approximately 1 7/8 inches exposed within the chamber 40. Thus the chamber 40 provides a slightly greater cross-sectional area for fluid flow than is provided by 1/2 inch diameter inlet and outlet passages 17 and 31. These details are mentioned, however, merely as a point of reference; and as earlier indicated the structural principles involved in the new cell can readily be adapted to different sized cells intended to operate at other current densities and to handle substantially different volumes of fluid.

The terminal studs 21 are suitably fashioned from the same material, i.e., tantalum, titanium, or alloys thereof, as the base metal of the electrodes. To increase conductivity and reduce heating, the studs may contain a core of more conductive metal such as silver or copper. The studs may also be made somewhat larger, particularly if it is desired to operate the cell at higher current densities. A limitation on operating at higher current densities is the dissipation of heat that may be generated. To reduce this problem an increased circulation of fluid externally of the electrode assemblage can be obtained by providing a wider clearance 48 between the plates 47 and the electrode assemblage; and with such a change it may be desirable to provide a discharge passage 31 which is somewhat larger than the fluid inlet passage 17.

The offset arrangement of the inlet passage 17 serves two purposes. It permits foreign solid matter which may be present in the inlet fluid to collect on the inner periphery of the end closure 11, minimizing the change of such materials being carried into the electrolysis chamber 40. In addition, the offset orientation of the inlet passage 17 and the substantial spacing of the electrode assemblage from end closure 11, i.e., a distance at least equal to the diameter of inlet passage 17, permits a more uniform fluid flow through the electrolysis chamber 40. It will be apparent that this offset orientation of the inlet passage 17 is controlled in part by its location in the end closure 11, and in part by the final position of roatary adjustment of the end closure 12 and associated electrode assemblage. In this connection there is ample resilience in the gasket 16 to permit the inlet passage to be adjusted to a position of non-alignment with the elctrolysis chamber 40.

Depending on the nature of the electrolyte being fed to the cell the polarity of the direct current passing between the electrodes should be reversed at more or less frequent intervals. It is particularly important to prevent calcium build-up as this can rapidly damage the platinum or platinum metal surface of the electrodes, and troublesome amounts of calcium are present in even moderately hard waters. Thus reversing the polarity of the cell may be desirable at 10 minute, 5 minute, or even shorter intervals; and for continuing trouble-free performance a shorter-than-necessary interval for changing polarity should be favored.

The transparent structure of the cell body, end closures and electrode mountings is of special advantage in promoting long life for the cell since it permits free inspection of the cell, even between the electrodes, while in operation, so that accumulating solids can be detected and remedied before damage to the electrodes has occurred. Practical tests in the electrolysis of saline solution for chlorine generation in the sanitizing of swimming pools and the like, indicate that the new type cell should, with reasonable care, have a useful life far exceeding that of cells previously available for such purposes. Furthermore, the full protection and insulation of the electrodes, except for the surfaces bounding the chamber 40, permits the use of the cell with electrolytes of much higher ionic concentration and corrosiveness than is normally encountered in swimming pool sanitization; and the cell is adapted for use in heavy duty chlorine generation of the the type required for sewage treatment, and for similarly severe electrolytic processes in the generation of other gaseous products of electrolysis.

Various changes and modifications in the electrolytic cell herein disclosed will occur to those skilled in the art, and to the extent that such changes and modifications are embraced by the appended claims, it is to be understood that they constitute part of the present invention.

We claim:

1. An electrolytic cell comprising an elongated tubular body, end closures for said tubular body carrying fluid inlet and outlet means, the outlet end closure being detachably secured to said body and having diametrically spaced apertures for receiving terminal studs of an elongated electrode assemblage extending axially of said tubular body, said electrode assemblage comprising flat plate electrodes supported in closely spaced parallel relation by an electrically insulating frame which defines with said electrodes an electrolysis chamber having a narrow rectangular cross section extending diametrically of said tubular body, said outlet end closure having an enlarged recess in the inner surface thereof extending diametrically between and beyond said stud receiving apertures and communicating with a central discharge aperture, said recess being substantially wider than said electrolysis chamber, and engagement of said terminal studs with said apertures disposing said electrolysis chamber diagonally of said recess, whereby fluid from said electrolysis chamber is subjected to a swirling action in passing through said recess to the discharge aperture thereof.

2. An electrolytic cell as defined in claim 1 wherein the tubular body, end closures and frame of said electrode assemblage are fashioned from transparent plastic material permitting visual inspection of the cell when in operation.

3. An electrolytic cell as defined in claim 1 where the frame of said electrode assemblage comprises a pair of side rails each having spaced parallel grooves for receiving and controlling the spacing of said electrodes, said rails being joined together by thin backing plates closely overlying the outer surfaces of said electrodes.

4. An electrolytic cell as defined in claim 3 wherein at least the tubular body and the side rails of said electrode assemblage are fashioned from transparent plastic material permitting visual inspection of the electrolysis chamber when the cell is in operation.

5. An electrolytic cell as defined in claim 3 wherein the recess in said outlet end closure protrudes beyond the backing plates of said electrode assemblage, and protruding portions of said recess are covered by plate members secured to said outlet end closure and having slight clearance with respect to said electrode assemblage.

6. An electrolytic cell as defined in claim 3 wherein adjacent edges of the electrodes and backing plates at the ends of said electrodes, and exposed portions of said terminal studs, are coated with an insulating sealant of rubbery consistency.

7. An electrolytic cell as defined in claim 1 wherein the electrodes are fashioned from a metal selected from the group consisting of tantalum, titanium and alloys thereof, and portions of the electrodes which bound said electrolysis chamber are faced with a more chemically resistant metal from the platinum metal group.

8. An electrolytic cell as defined in claim 1 wherein the terminal studs include means for providing detachable, pressure tight mounting in said outlet end closure.

9. An electrolytic cell as defined in claim 1 wherein the terminal studs include means for providing detachable, pressure tight mounting in said outlet end closure, said mounting means comprising an O-ring gasket positioned on each stud for sealing engagement with a shoulder within the stud aperture of said end closure, and a threaded end on said stud for securing a clamp nut externally of said end closure.

10. An electrolytic cell as defined in claim 1 wherein the fluid inlet and outlet comprise tubular extensions of said end closures having means for externally clamping flexible fluid lines thereof.

11. An electrolytic cell as defined in claim 10 wherein the tubular extension of said outlet end closure is of generally U-shaped contour disposing the free end thereof in radially spaced relation to and in substantial alignment with the periphery of said end closure.

12. An electrolytic cell as defined in claim 1 wherein the cross-sectional area of said electrolysis chamber is at least as great as the cross-sectional area of said fluid inlet and outlet means, and the width and depth of the recess in said outlet end closure are each greater than the diameter of said fluid outlet means.

13. An electrolytic cell as defined in claim 1 wherein said electrode assemblage extends through substantially the full inner diameter of said tubular body while permitting free rotary and axial movement with respect thereto.

14. An electrolytic cell as defined in claim 1 wherein the fluid inlet means is radially spaced from the center of the inlet end closure and in a position of non-alignment with the electrolysis chamber of said electrode assemblage, and the electrode assemblage terminates at a distance from said inlet end closure at least equal to the diameter of said fluid inlet means.

References Cited

UNITED STATES PATENTS

| | | | |
|---|---|---|---|
| 2,882,210 | 4/1959 | Jenks | 204—151 |
| 2,887,444 | 5/1959 | Lindstedt | 204—152 |
| 3,192,146 | 6/1965 | Vellas et al. | 204—240 |
| 3,282,823 | 11/1966 | Richards | 204—272 |
| 3,361,663 | 1/1968 | Murray et al. | 204—278 |
| 3,378,479 | 4/1968 | Colvin et al. | 204—248 |

JOHN H. MACK, Primary Examiner

A. C. PRESCOTT, Assistant Examiner

U.S. Cl. X.R.

204—149